Feb. 24, 1925.
G. F. BASTMAN
JOINT ADAPTER FOR FISHING RODS
Filed Sept. 2, 1922
1,527,463
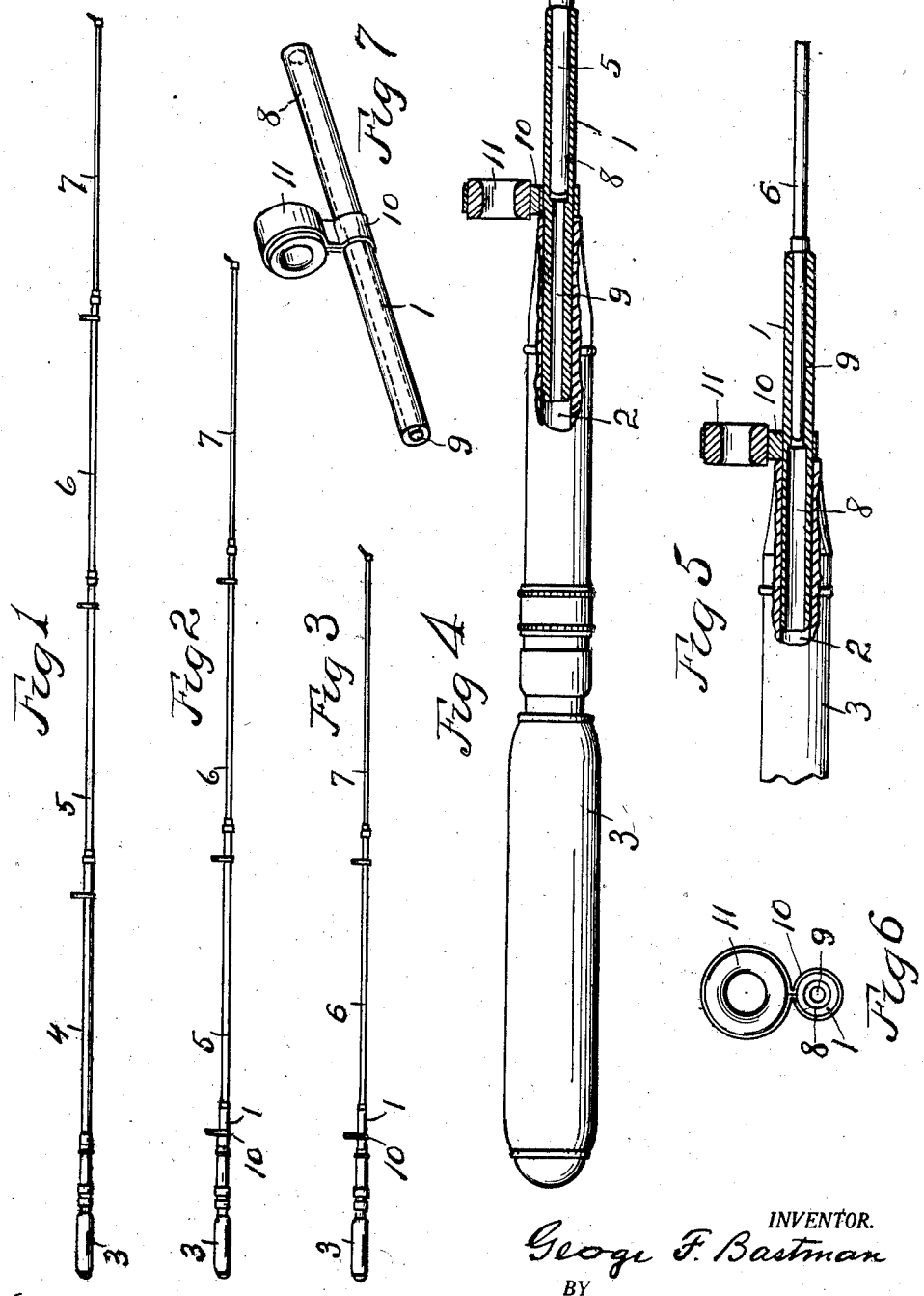
INVENTOR.
George F. Bastman
BY Warren D. House
His ATTORNEY.

Patented Feb. 24, 1925.

1,527,463

UNITED STATES PATENT OFFICE.

GEORGE F. BASTMAN, OF KANSAS CITY, MISSOURI.

JOINT ADAPTER FOR FISHING RODS.

Application filed September 2, 1922. Serial No. 586,014.

*To all whom it may concern:*

Be it known that I, GEORGE F. BASTMAN, a citizen of the United States, residing at Kansas City, in the county of Jackson and State of Missouri, have invented a certain new and useful Improvement in Joint Adapters for Fishing Rods, of which the following is a specification.

My invention relates to improvements in joint adapters for fishing rods.

The object of my invention is to provide a tubular joint adapter arranged to be reversed in the joint receiving socket of a fishing rod handle, and having end holes of different diameters, so that it may have fitted therein rod joints of different diameters, by reversing the adapter, whereby a fishing rod may be shortened either one or two joints.

My invention provides further a joint adapter of the kind described provided with a line holding guide, which is adapted to further serve the function of a top which is adapted to bear against the end of the rod handle.

Still another object of my invention is to provide an adapter of the kind described, which is simple, cheap to make, strong, durable, not liable to get out of order, and which may be readily applied to a fishing rod handle and to two of the joints thereof.

The novel features of my invention are hereinafter fully described and claimed.

In the accompanying drawing, which illustrates the preferred embodiment of my invention, Fig. 1 is a side view of an ordinary fishing rod having a handle and four joints, and with which my improved adapter may be used.

Fig. 2 is a side view of the rod showing my improved adapter fitted in the handle with the second joint fitted therein and the first joint removed.

Fig. 3 is a view similar to Fig. 2, the first and second joints being removed and the third joint shown fitted in the adapter.

Fig. 4 is an enlarged longitudinal sectional view of the adapter shown mounted in the handle, the latter being shown partly in side elevation and partly in longitudinal section, the adapter being disposed in the handle so as to receive the second joint, the butt end of which is shown mounted in the adapter.

Fig. 5 is a view similar to Fig. 4, the handle being partly broken away, the adapter reversed therein from the position shown in Fig. 4, and the butt end of the third joint being shown mounted in the adapter.

Fig. 6 is an end view of the adapter.

Fig. 7 is a perspective view of the adapter.

Similar reference characters designate similar parts in the different views.

In its ordinary form the adapter comprises cylindrical body 1, the opposite ends of which have the same outside diameter, so that the body 1 may be reversed and fitted at either end in the socket 2 of an ordinary fishing rod handle 3.

4, 5, 6 and 7 designate respectively the four joints of the rod, the joint 4 being the first joint which is adapted to be removably fitted in the socket 2.

The body 1 has at its respective ends, two longitudinal holes 8 and 9 adapted to respectively receive and have fitted therein the butts of the joints 5 and 6, the latter having different diameters.

Midway on the adapter body 1 is a line guide, comprising a clip 10 encircling and secured to the body 1, and an eye 11 embraced by and securely held in the clip. The clip 10 is adapted to bear against the end of the handle 3, and affords the further function of a stop for limiting the inward movement of the body 1, when either end of the latter is inserted in the socket 2.

In the operation of the adapter, when it is desired to use joints 5, 6 and 7, the adapter is inserted in the socket 2, with the hole 8 at the outer end. The second joint 5 is then inserted in the outer end of the body 1, thus providing a rod with three joints and the handle.

When it is desired to use only joints 6 and 7, the joints 4 and 5 are discarded, the body 1 placed in the socket 2 with the hole 9 at its outer end, and the butt of the joint 6 is inserted in the hole 9, thus providing a rod with two joints and the handle.

I do not limit my invention to the structure shown and described, as modifications, within the scope of the appended claims, may be made without departing from the spirit of my invention.

What I claim is:—

1. A joint adapter for fishing rods comprising a tube having longitudinal end holes of different diameters adapted to have respectively fitted therein rod joints of different diameters and having the same outside diameter at opposite ends so that it may be reversed in a joint receiving socket of a fishing rod handle, substantially as set forth.

2. A joint adapter for fishing rods comprising a tube having a longitudinal hole in one end adapted to receive a rod joint, its other end being adapted to be fitted in a joint receiving socket of a fishing rod handle, and a line guide secured to the tube and adapted to form a stop arranged to bear against the end of the handle, substantially as set forth.

3. A joint adapter for fishing rods comprising a tube having longitudinal end holes of different diameters adapted to have respectively fitted therein rod joints of different diameters and having the same outside diameter at opposite ends so that it may be reversed in a joint receiving socket of a fishing rod handle, and a line guide secured to the tube and adapted to form a stop arranged to bear against the end of the handle, substantially as set forth.

In testimony whereof I have signed my name to this specification.

GEORGE F. BASTMAN.